United States Patent
Yi

(10) Patent No.: US 8,275,085 B2
(45) Date of Patent: Sep. 25, 2012

(54) APPARATUS AND METHOD FOR RECOVERING DATA

(75) Inventor: Ju-hwan Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1224 days.

(21) Appl. No.: 12/052,091

(22) Filed: Mar. 20, 2008

(65) Prior Publication Data

US 2009/0135975 A1    May 28, 2009

(30) Foreign Application Priority Data

Nov. 27, 2007 (KR) .................. 10-2007-0121705

(51) Int. Cl.
*H04L 7/02* (2006.01)
(52) U.S. Cl. ................... 375/360; 375/361
(58) Field of Classification Search ......... 375/355–356, 375/371, 360–362; 327/2, 7, 17, 24, 78–79; 360/41

See application file for complete search history.

(56) References Cited

U.S. PATENT DOCUMENTS

| | | | |
|---|---|---|---|
| 5,148,450 A * | 9/1992 | Hollyer | 375/327 |
| 6,178,212 B1 * | 1/2001 | Akashi | 375/355 |
| 6,208,169 B1 * | 3/2001 | Wong et al. | 326/93 |
| 6,278,754 B1 * | 8/2001 | Thomas et al. | 375/360 |
| 6,741,668 B1 * | 5/2004 | Nakamura | 375/376 |
| 6,941,484 B2 * | 9/2005 | To et al. | 713/500 |
| 7,366,269 B2 * | 4/2008 | Ishida et al. | 375/368 |
| 7,668,609 B2 * | 2/2010 | Fuller | 700/94 |
| 7,756,232 B2 * | 7/2010 | Aoki et al. | 375/355 |
| 2003/0098723 A1 * | 5/2003 | Natsume | 327/91 |
| 2006/0062339 A1 * | 3/2006 | Briones | 375/375 |
| 2006/0067440 A1 * | 3/2006 | Hsu et al. | 375/345 |
| 2006/0109942 A1 * | 5/2006 | Vallet | 375/355 |
| 2009/0122852 A1 * | 5/2009 | Smith et al. | 375/228 |
| 2009/0262876 A1 * | 10/2009 | Arima et al. | 375/374 |
| 2010/0002822 A1 * | 1/2010 | Arima et al. | 375/371 |
| 2010/0164575 A1 * | 7/2010 | Suzuki et al. | 327/159 |

* cited by examiner

*Primary Examiner* — Lawrence B Williams
(74) *Attorney, Agent, or Firm* — NSIP Law

(57) ABSTRACT

An apparatus for recovering data and a method thereof are provided. The apparatus includes a reference clock generator which generates a reference clock, and a data recovering unit which detects an edge of received data and recovers the data using a time difference between a reference point of the reference clock and the detected edge.

12 Claims, 5 Drawing Sheets

APPARATUS AND METHOD FOR RECOVERING DATA

CROSS-REFERENCE TO RELATED APPLICATIONS

This application claims the benefit under 35 U.S.C. §119 (a) of a Korean Patent Application No. 10-2007-121705, filed on Nov. 27, 2007, in the Korean Intellectual Property Office, the entire disclosure of which is hereby incorporated by reference.

TECHNICAL FIELD

The following description relates to apparatus and method for recovering data, and more particularly, to an apparatus which recovers data using a time difference between a reference clock and an edge of received data, and a method thereof.

BACKGROUND

With the development of electronic technologies, various types of data processing apparatuses have been used. Among these data processing apparatuses, a data recovering apparatus recovers received serial data using a tracking method or an oversampling method.

The tracking method is to set a fixed sampling time synchronized with received data, to extract data according to the set sampling time, and to sample the data in parallel using the extracted data. In this method, a circuit which is operated in the unit of bit is required to set the sampling time.

The oversampling method is to delay a pre-set clock signal in the unit of time shorter than 1-bit time and to sample data through an overlapped portion. In this method, in order to obtain a bit unit time, a clock which is operated in the unit of bit has to be generated or a multi-phase clock having a time resolution corresponding to the bit unit is required. Therefore, there is a speed limit in operating the apparatus.

In particular, if a run length limited (RLL) code is used to use a channel capacity efficiently, an interval between edges becomes narrower, which makes it more difficult to apply the conventional methods.

SUMMARY

Accordingly, in one general aspect, there is provided an apparatus for recovering data, which recovers data using a time difference between a reference clock and an edge of received data, and a method thereof.

In another aspect, an apparatus for recovering data includes a reference clock generator which generates a reference clock, and a data recovering unit which detects an edge of received data and recovers the data using a time difference between a reference point of the reference clock and the detected edge.

The data recovering unit may include an edge detector which detects a rising edge and a falling edge of the received data, a digital converter which sets a start point of a half period of the reference clock as the reference point, compares the reference point with the rising edge or the falling edge, calculates a time difference with respect to the reference point, and outputs the calculated time difference as a digital value, and a data detector which recovers the received data using the digital value output in the unit of half period.

The edge detector may detect the edge based on a plurality of thresholds.

If a plurality of the digital converters are provided, the data detector may combine digital values output from the plurality of digital converter in series.

The reference clock may be generated using a synchronization clock of the received data.

If a plurality of the data recovering units are provided, the plurality of data recovering units may process the received data in parallel and alternately every half period of the reference clock.

The apparatus may further include a data arrangement unit which combines data processed by the plurality of data recovering units in series.

In still another aspect, a method for recovering data includes generating a reference clock, and detecting an edge of the received data and recovering the data using a time difference between a reference point of the reference clock and the detected edge.

The detecting and recovering operation may include detecting a rising edge and a falling edge of the received data, digital-converting which comprises setting a start point of a half period of the reference clock as the reference point, comparing the reference point with the rising edge or the falling edge, calculating a time difference with respect to the reference point, and outputting the calculated time difference as a digital value, and recovering the received data using the digital value output in the unit of half period.

The detecting operation may detect the edge based on a plurality of thresholds.

The digital-converting operation may be performed by a plurality of digital converters, and the recovering operation may combine digital values output from the plurality of digital converters in series.

The reference clock may be generated using a synchronization clock of the received data.

The detecting and recovering operation may be performed by a plurality of data recovering units, and the plurality of data recovering units may process the received data in parallel and alternately every half period of the reference clock.

The method may further include combining the data processes by the plurality of data recovering units in series.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
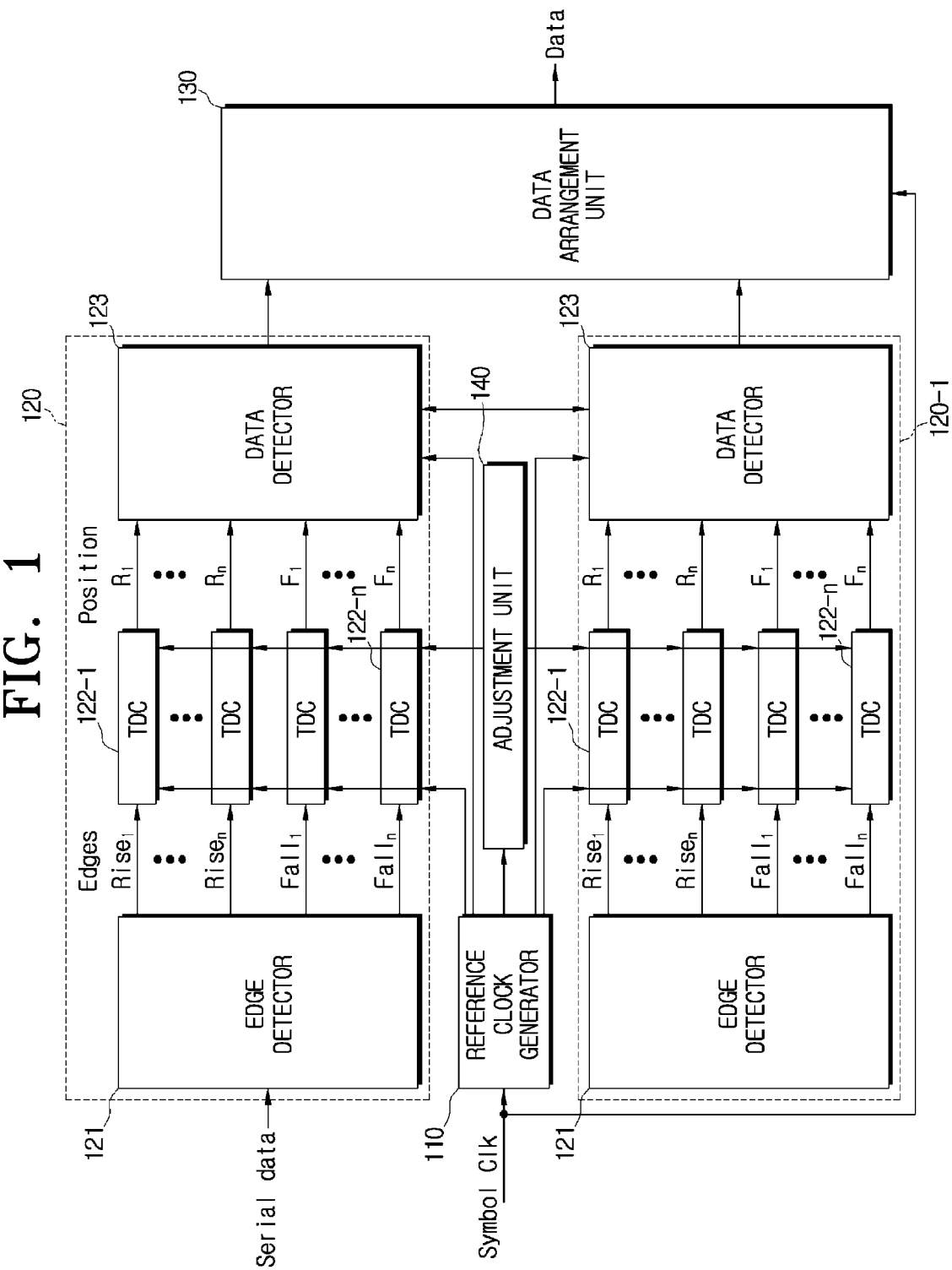
FIG. 1 is a block diagram illustrating an apparatus for recovering data according to an exemplary embodiment.

FIG. 1 is a block diagram illustrating an apparatus for recovering data according to an exemplary embodiment. Referring to FIG. 1, an apparatus 100 for recovering data according to an exemplary embodiment comprises a reference clock generator 110, data recovering units 120, 120-1, a data arrangement unit 130, and an adjustment unit 140.

The reference clock generator 110 generates a reference clock in a symbol unit using a synchronization clock of received data. Also, the reference clock generator 110 may generate a reference clock in a symbol unit according to a designer's predetermined setting. Accordingly, no bit clock is required and also a high speed processing is possible.

A single data recovering unit may be provided. Therefore, only a single data recovering unit 120 will be described hereinafter for the sake of clarity. The data recovering unit 120 comprises an edge detector 121, digital converters 122-1 to 122-n, and a data detector 123.

The edge detector 121 detects a rising edge and a falling edge from received data, i.e., from serial data. The data may be received from an external module chip or an external system of the data recovering apparatus.

The edge detector 121 compares the received data with a pre-set threshold to detect a rising edge and a falling edge. More specifically, the edge detector 121 detects a rising edge when a data value is converted from being less than the threshold to being greater than the threshold, and detects a falling edge when the data value is converted from being greater than the threshold to being less than the threshold. Accordingly, the edge detector 121 outputs a pulse signal corresponding to the rising edge or the falling edge detected within a half period of the reference clock generated by the reference clock generator 110.

Figure 2:
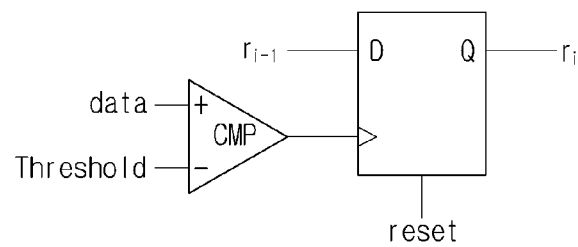
FIGS. 2 and 3 are views illustrating various examples of an edge detector of FIG. 1.
Figure 3:
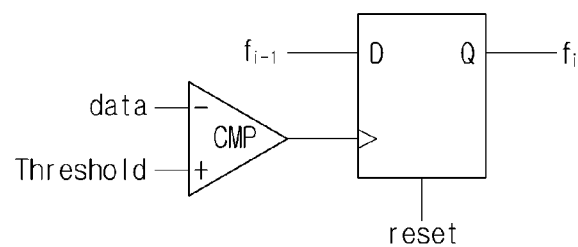

The edge detector 121 may comprise a rising edge detector shown in FIG. 2 or a falling edge detector shown in FIG. 3.

Referring to FIG. 2, the rising edge detector comprises a comparator to compare received data with a threshold, and a D-flip flop to receive a previous edge detection value and a value output from the comparator. The comparator outputs a high value if a received data value is greater than the threshold and outputs a low value if the received data value is less than the threshold.

Referring to FIG. 3, the falling edge detector has a similar structure as in FIG. 2. However, a comparator is designed to have a polarity opposite to that of FIG. 2. That is, the falling edge detector comprises a comparator to compare received data with a threshold and a D-flip flop to receive a previous edge detection value and a value output from the comparator. The comparator of the falling edge detector outputs a high value if a received data value is less than the threshold and outputs a low value if the data value is greater than the threshold.

The edge detector 121 may set a plurality of thresholds. In this case, edge detectors are provided for respective thresholds. Also, even if a value of received data is attenuated and thus does not reach a threshold, a rising edge or a falling edge can be accurately detected due to the plurality of thresholds.

The threshold of the edge detector 121 may be set based on a location of a horizontal eye opening of an eye diagram. If an eye is almost closed, it is difficult to detect a position of an edge with a single threshold, and therefore, a plurality of thresholds is used to accurately detect the position of the edge.

If a plurality of thresholds is used, a rising edge or a falling edge is detected by comparing a received data value with the respective thresholds.

The digital converters 122-1 to 122-n set a start point of a half period of the reference clock as a reference point, compares the reference point with the rising edge or falling edge during the half period of the reference clock, and calculates a time difference with respect to the reference point. Next, the digital converters 122-1 to 122-n output the calculated time difference as a digital value. The digital converters 122-1 to 122-n may use a time to digital converter (TDC) that can be realized by a plurality of delay buffers and a flip flop.

In this embodiment, the digital converters 122-1 to 122-n are described as the TDCs but is merely an example. Any configuration that can calculate a time difference between a reference clock signal and an edge position of data is applied. Also, in this embodiment, the TDC has the structure shown in FIG. 4 but is not limited to this. The structure of the TDC can be modified. Its description will be made in detail with reference to FIG. 4.

The data detector 123 combines in series digital values output from the digital converters 122-1 to 122-n, i.e., from the TDCs during the half period of the reference clock, thereby recovering the received data.

Also, a plurality of data recovering units may be provided. In this case, the plurality of data recovering unit process received data in parallel and alternately every half period of the reference clock.

More specifically, if two data recovering units 120, 120-1 are provided as shown in FIG. 1, the first data recovering unit 120 processes the received data every odd numbered half period of the reference clock and the second data recovering unit 120-1 processes the received data every even numbered half period of the reference clock. Also, if three data recovering units are provided, each of the data recovering units sets overlapped portion in a pre-set time so that they can perform a continuous data processing.

The data arrangement unit 130 combines the data processed in the plurality of data recovering units 120, 120-1 in series. The data recovering units 120, 120-1 process data of received serial data that corresponds to an odd numbered reference clock or an even numbered reference clock, whereas the data arrangement unit 130 recovers data for both the odd numbered reference clock and the even numbered reference clock, i.e., all the received data.

In this case, the data arrangement unit 130 adjusts a synchronization of the symbol and a synchronization of the received data, thereby combining the data in series.

Also, the adjustment unit 140 determines a delay time of a delay buffer of the TDC. The adjustment unit 140 adjusts a delay time of each of delay buffers of the TDCs, thereby setting a maximum delay time of the TDCs to be greater than a symbol period of the reference clock.

Figure 4:
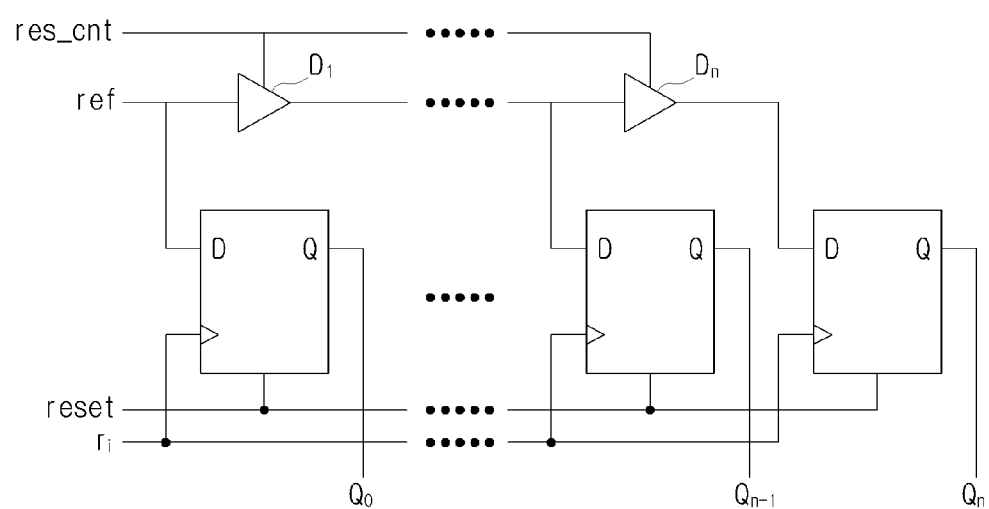
FIG. 4 is a view illustrating an example of a digital converter of FIG. 1.

FIG. 4 is a view illustrating the digital converter of FIG. 1. The digital converter may comprise a plurality of delay buffers $D_1$ to $D_n$ and a plurality of D-flip flops. In FIG. 4, 'res_cnt' denotes a signal that supplies a power to the buffers and delays the respective buffers, 'ref' denotes a reference clock, and '$r_i$' denotes a pulse signal corresponding to a rising edge or a falling edge output from the edge detector 121.

If a delay of each of the delay buffers $D_1$ to $D_n$ is 10 ps and if the reference clock 'ref' is maintained at a 'low' level during n*10 ps, the outputs from all the delay buffers $D_1$ to $D_n$ have a low value. If the reference clock 'ref' is maintained at a 'high' level, the outputs from all the delay buffers $D_1$ to $D_n$ have a high value.

If the reference clock 'ref' is changed to a 'high' level and if the edge detector 121 outputs a pulse signal '$r_i$' corresponding to a rising edge in the state where first through fifth buffers are delayed, output values from the delay buffers $D_1$ to $D_5$ are latched and the latched values are output as $Q_0$ to $Q_n$. In this case, $Q_0$ to $Q_5$ are 1 but the reminders $Q_6$ to $Q_n$ are 0. Accordingly, the digital output value is 5.

Figure 5:
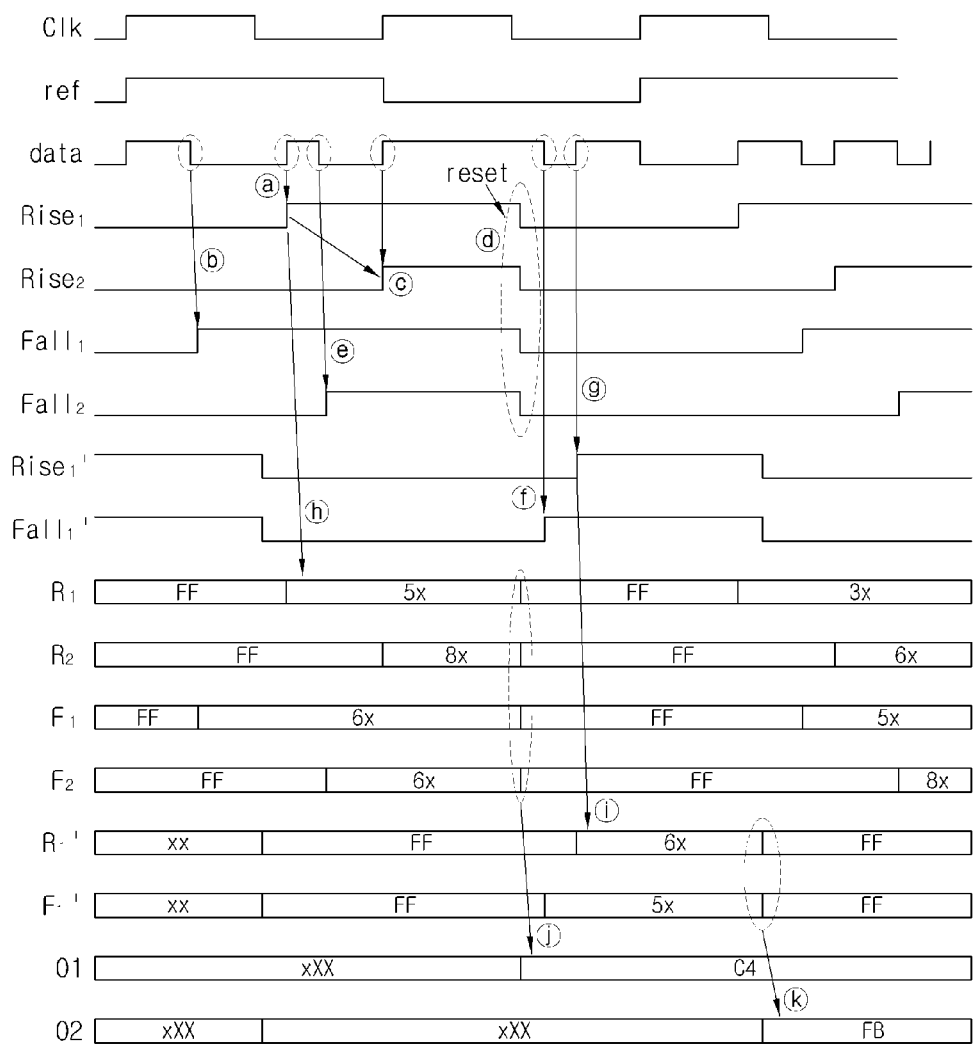
FIGS. 5 and 6 is diagrams illustrating an example of a process of recovering data of the apparatus for recovering data according to exemplary embodiments.

FIG. 5 is a diagram illustrating a process of recovering data according to an exemplary embodiment. Hereinafter, the process of recovering data will be described with reference to FIGS. 1 and 5.

It can be seed from FIG. 5 that 1 period of a reference clock 'ref' corresponds to 2 periods of a data synchronization signal 'CLK'.

In FIG. 5, 'Rise 1', 'Rise 2', 'Fall 1' and 'Fall 2' denote signals output from the edge detector 121. More specifically, the edge detector 121 of the data recovering unit 120 processes and outputs rising edge 'Rise 1' and 'Rise 2' signals or falling edge 'Fall 1' and 'Fall 2' signals during a half period of a reference clock signal.

That is, 'Rise 1' and 'Rise 2' are pulse signals 'a' and 'c' that correspond to edges detected by the rising edge detector (see FIG. 2), and 'Fall 1' and 'Fall 2' are pulse signals 'b' and 'e' that correspond to edges detected by the falling edge detector (see FIG. 3). If data processing is completed during a half period of the reference clock signal, the rising edge detector and the falling edge detector of the edge detector 121 are reset to 'd' according to a synchronization clock signal.

The edge detector 121 of the second data recovering unit 120-1 processes data during the next half period, subsequent to the processing in the edge detector 121 of the first data recovering unit 120-1. The edge detector 121 of the second data recovering unit 120-1 outputs 'Rise 1' (g) and 'Fall 1' (f)'.

The signals 'Rise 1 (a)', 'Rise 2 (c)', 'Fall 1 (b)', and 'Fall 2 (e)' and 'Rise 1' (g) and 'Fall 1' (f) output from the respective edge detectors 121 are input to the respective TDCs 122-1 to 122-n in parallel. The TDC may have the structure shown in FIG. 4. Accordingly, each TDC outputs a digital value for an edge position using a time difference generated by each signal with respect to a start point of a half period (reference point).

More specifically, 'R1' outputs a digital value '5x' for a first rising edge position 'a' of an odd numbered half period duration of the reference clock (e.g. the first half period), and the digital value '5x' indicates that a rising edge appears at a position delayed as much as 5 bits from the start point of the half period. The digital value '3x' indicates that a rising edge appears at a position delayed as much as 3 bits from the start point of the third half period. 'x' denotes an output value of the TDC within a bit time and indicates that the position of the edge can be accurately detected.

'R2' outputs digital values '8x' and '6x' for a second rising edge position of an odd numbered half period duration of the reference clock.

'F1' outputs digital values '6x' and '5x' for a first falling edge position of an odd numbered half period duration of the reference clock, and 'F2' outputs digital values '6x' and '8x' for a second falling edge position of an odd numbered half period duration of the reference clock.

"R1" outputs a digital value '6x' for a first rising edge position of an even numbered half period duration of the reference clock, and "F1" outputs a digital value '5x' for a first falling edge position of an even numbered half period duration of the reference clock.

The digital values output from 'R1', 'R2', 'F1', and 'F2' are input to the data detector 123 of the first data recovering unit 120, whereas the digital values output from 'R1" and 'F1" are input to the data detector 123 of the second data recovering unit 120-1.

In FIG. 5, '01' indicates data 'C4' which is obtained as a result of combining the digital values from 'R1', 'R2', 'F1', 'F2' in series, and '02' indicates data 'FB' which is obtained as a result of combining the digital values from 'R1" and 'F1" in series.

The data arrangement 130 combines in series the data 'C4' output from the data detector 123 of the first data recovering unit 120 and the data 'FB' output from the data detector 123 of the second data recovering unit 120-1, thereby recovering the received serial data.

Figure 6:
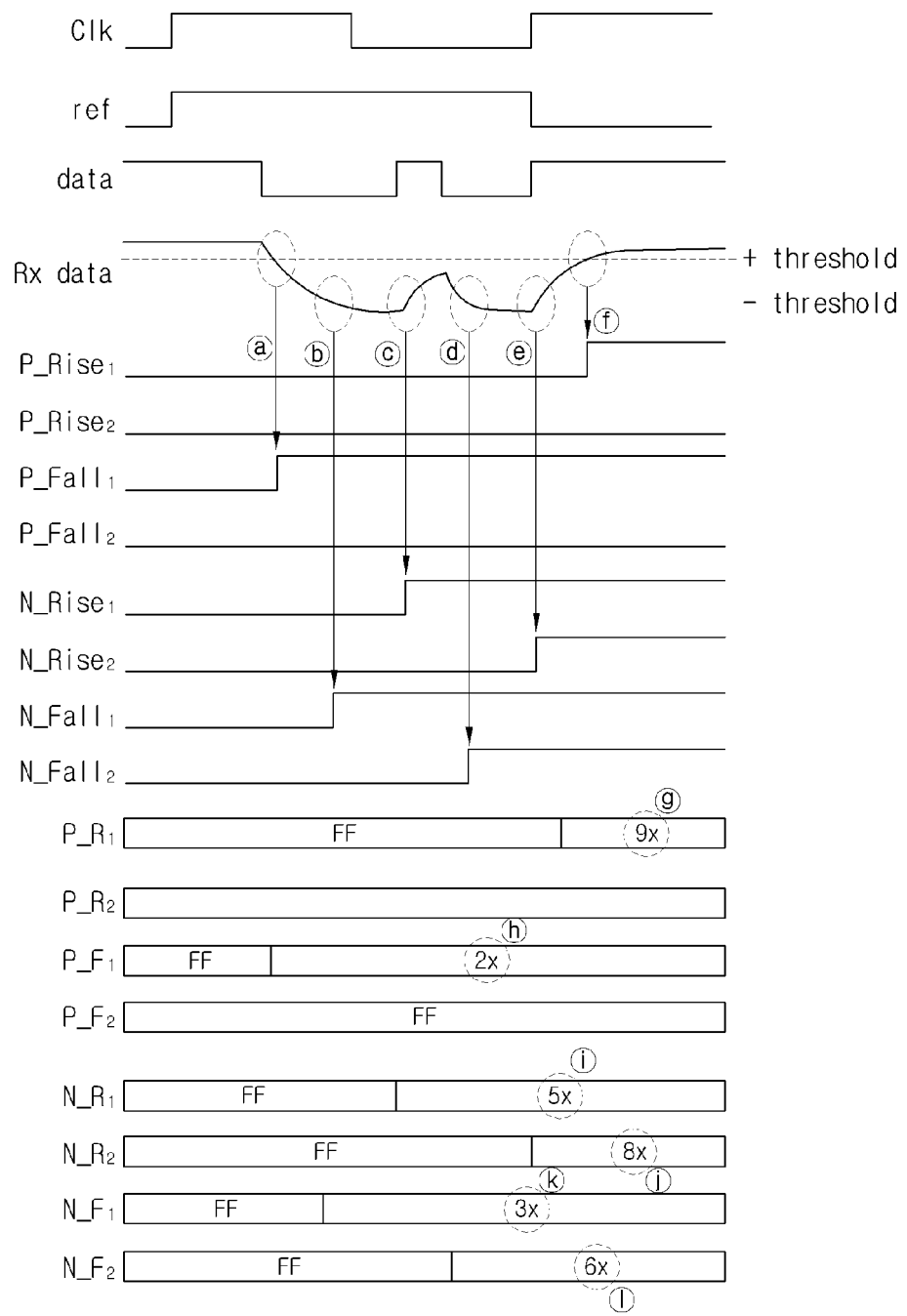

FIG. 6 is a diagram illustrating a process of recovering data according to another exemplary embodiment. In FIG. 6, an edge detector having a positive (+) threshold and a negative (−) threshold is used. If received data 'Rx data' has a waveform shown in FIG. 6, a plurality of thresholds is used to detect a accurate edge position.

More specifically, at the portion marked 'a' of the received data 'Rx data', a falling edge 'P_Fall 1 is detected since a data value is converted from being greater than a positive threshold to being less than the positive threshold. Also, at the portions marked 'b' and 'd', a falling edge 'N_Fall 1' and a falling edge 'N_Fall 2' are detected since the data value is converted from being greater than a negative threshold to being less than the negative threshold.

At the portions marked 'c' and 'e', a rising edge 'N_Rise 1' and a rising edge 'N_Rise 2' are detected since the data value is converted from being less than the negative threshold to being greater than the negative threshold. At the portion marked 'f', a rising edge 'P_Rise 1' is detected since the data value is converted from being less than the positive threshold to being greater than the positive threshold.

The received data is converted into digital values using a time difference between the detected rising edge or falling edge and a reference point, and the data is recovered in the same way as in FIG. 5.

Figure 7:
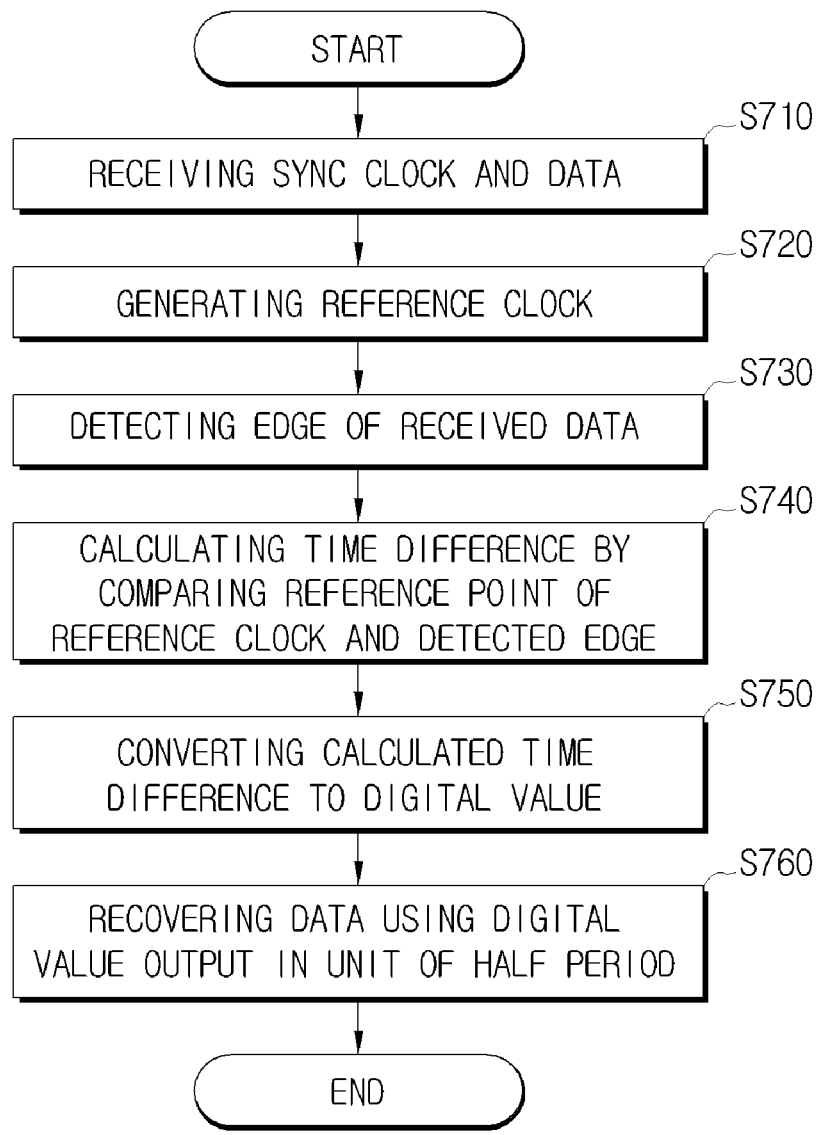
FIG. 7 is a flowchart illustrating a method for recovering data according to an exemplary embodiment.

FIG. 7 is a flowchart illustrating a method for recovering data according to an exemplary embodiment. Referring to FIG. 7, a synchronization clock and data are received (S710). Next, a reference clock is generated using the received synchronization clock in order to recover the received data (S720). The reference clock has a period corresponding to a predetermined period of the synchronization clock. For example, 1 period of the reference clock corresponds to 2 periods of the synchronization clock. Also, the period of the reference clock may be arbitrarily set by a designer.

An edge of the received data is detected (S730). More specifically, a rising edge and a falling edge are detected from the received data during a half period of the reference clock, and a pulse signal is output according to the detected edge.

Next, a time difference is calculated by comparing the detected edge with a reference point of the reference clock (S740). The reference point of the reference clock may be a start point of the half period of the reference clock. That is, the time difference is calculated using a position of the edge detected at operation S730 from the start point of the half period of the reference clock.

The calculated time difference is converted into a digital value (S750). Since this step was described above with reference to FIGS. 4 to 6, its descriptions are omitted.

Next, the digital values each output in the unit of half period are combined with one another in series such that the received data is recovered (S760). The data recovering process described in FIG. 7 uses a single data recovering unit 120 but may perform a continuous data recovering using the plurality of data recovering units 120, 120-1.

In this case, the data recovering operations S710 and S760 are performed in parallel and alternately in the unit of half period of the reference clock. That is, a first data recovering process is performed with respect to data received during an odd numbered half period of the reference clock through the operations S710 to S760, whereas a second data recovering process is performed with respect to data received during an even numbered half period of the reference clock through the operations S710 to S760.

Next, the processed data are combined with one another in series such that the whole data is recovered. Accordingly, the data recovering process is performed with respect to received data in real time.

As described above, according to an exemplary embodiment, a location of a rising edge or a falling edge of received serial data may be detected for a half period of a reference clock, and serial data may be recovered based on the detected location information. Accordingly, an operation for recovering serial data may be processed on symbol units, not by bit units so that an additional circuit may not be necessary and power consumption may be reduced as well. The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for recovering data, the apparatus comprising:
 a reference clock generator which generates a reference clock; and
 a data recovering unit which detects an edge of received data and recovers the data using a time difference between a reference point of the reference clock and the detected edge,
 wherein the data recovering unit comprises:
  an edge detector which detects a rising edge and a falling edge of the received data,
  digital converters which set a start point of a half period of the reference clock as the reference point, compare the reference point with the rising edge or the falling edge of the received data, calculate a time difference with respect to the reference point, and output the calculated time difference as a digital value, and
  a data detector which recovers the received data using the digital value output in the unit of half period of the reference clock.

2. The apparatus of claim 1, wherein the edge detector detects the rising edge or the falling edge of the received data based on a plurality of thresholds.

3. The apparatus of claim 1, wherein the data detector combines digital values from the digital converters in series.

4. The apparatus of claim 1, wherein the reference clock is generated using a synchronization clock of the received data.

5. The apparatus of claim 1, further comprising:
 a plurality of data recovering units, wherein the plurality of data recovering units process the received data in parallel and alternately every half period of the reference clock.

6. The apparatus of claim 5, further comprising a data arrangement unit which combines the received data processed by the plurality of data recovering units in series.

7. A method for recovering data, the method comprising:
 generating a reference clock; and
 detecting an edge of received data and recovering the data using a time difference between a reference point of the reference clock and the detected edge,
 wherein the detecting an edge of received data and recovering the data comprises:
  detecting a rising edge and a falling edge of the received data,
  digital-converting which comprises setting a start point of a half period of the reference clock as the reference point, comparing the reference point with the rising edge or the falling edge of the received data, calculating a time difference with respect to the reference point, and outputting the calculated time difference as a digital value, and
  recovering the received data using the digital value output in the unit of half period of the reference clock.

8. The method of claim 7, wherein the detecting operation detects the rising edge or the falling edge of the received data based on a plurality of thresholds.

9. The method of claim 7, wherein the digital-converting operation is performed by a plurality of digital converters, and wherein the recovering operation combines digital values output from the plurality of digital converters in series.

10. The method of claim 7, wherein the reference clock is generated using a synchronization clock of the received data.

11. The method of claim 7, wherein the detecting and recovering operation is performed by a plurality of data recovering units, and
 wherein the plurality of data recovering units process the received data in parallel and alternately every half period of the reference clock.

12. The method of claim 11, further comprising combining the received data processed by the plurality of data recovering units in series.

* * * * *